Feb. 28, 1933.  E. L. DIXON  1,899,318

EDUCATIONAL DRAWING INSTRUMENT

Filed Aug. 10, 1929

Inventor
Edna Leola Dixon

Attorney

Patented Feb. 28, 1933

1,899,318

UNITED STATES PATENT OFFICE

EDNA LEOLA DIXON, OF BALTIMORE, MARYLAND, ASSIGNOR TO SPEED-UP GEOMETRY RULER CO., INC., OF BALTIMORE, MARYLAND, A CORPORATION OF MARYLAND

EDUCATIONAL DRAWING INSTRUMENT

Application filed August 10, 1929. Serial No. 384,955.

This invention relates to educational appliances and particularly to an educational drawing instrument designed as an aid to the graphic teaching of geometry, although it is equally intended for general uses.

The broad object of the invention is to provide an instrument of the class described in which facilities are provided for tracing the several geometric forms by which the study of geometry is exemplified, and means afforded for the tracing of similar polygons of different size by proper manipulation of the instrument.

Other objects of the invention will appear as the following description of a preferred embodiment thereof proceeds.

In the following drawing.

Figures 1, 2:
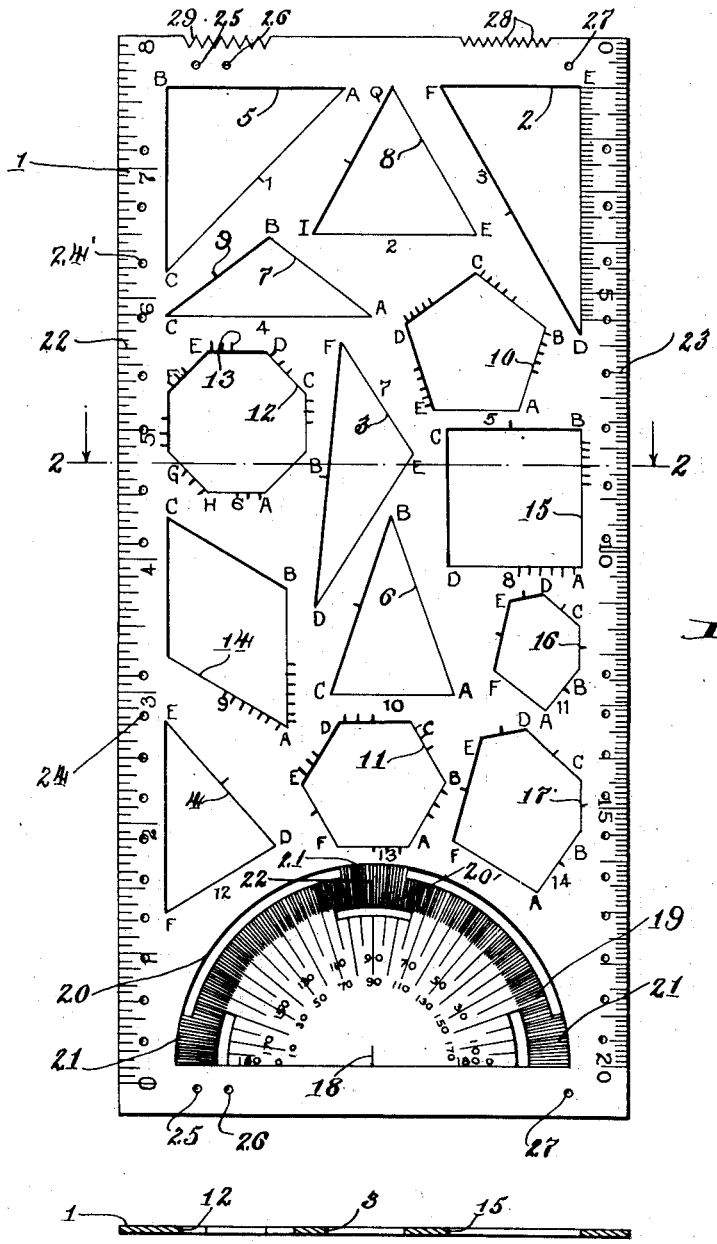
Fig. 1 is a plan view of my drawing instrument.
Fig. 2 is a section taken along the line 2—2 of Fig. 1.

Referring now in detail to the figures, the numeral 1 represents a plate preferably constructed from a sheet of metal, celluloid, or other kindred substance having substantial rigidity, and of such size and shape as to fit conveniently between the leaves of a text book of usual size. A convenient margin being reserved on all sides of this sheet or plate, the rest of its area is interspersed except at one end with a plurality of polygonal cut-outs designed to be employed as stencils, by applying the drawing instrument to a sheet of paper and tracing around the edg of the desired cut-out.

The polygonal forms imparted to these cut-outs are those of polygons with which the student becomes necessarily acquainted in the study of plain geometry. First there is a series of triangles including the right scalene triangle 2, the obtuse scalene triangle 3, and the acute triangle 4. This represents the three possible types of scalene triangles, of which there are of course, an infinite number of variations. In addition, there is a series of isosceles triangles, the right isosceles triangle 5, the acute isosceles triangle 6, and the obtuse isosceles triangle 7. These are representative of all types of isosceles triangles. An equi-lateral triangle 8 is also provided, this completing the examples of every genus of triangles.

It will be noted that the right triangles 2 and 3 have been arranged on the sheet 1 with their sides parallel respectively to the top and sides of the sheet, thus facilitating the drawing of right triangles the sides of whose included right angles are parallel respectively to the sides and top of the sheet 1.

Examples of regular polygons are also shown including the pentagon 10, hexagon 11 and octagon 12.

It is a known law of mathematics that if each side except one, of a polygon is prolonged by a proportionate amount, the remaining side may be freely drawn in and the ensuing polygon will be similar in shape to the original: but larger in size. To permit the student to draw regular polygons similar to but larger than those provided by the cut-outs, each polygon of more than three sides is furnished on every side but one with an index mark 13 determining equal distances from the several vertices of the polygon. By drawing in a side of the polygon and then without removing the pencil, but sliding the instrument in the direction of the drawn line a distance equal to the line segment defined by the index mark 13, drawing in this extended distance, and then successively performing the same operation with respect to every side of the polygon, except one, and then closing the final side of the polygon, a resulting polygon is formed, similar to but of larger size than the original employed cut-out. This rule could be followed with regard to the triangles, but in these instances the index marks are superfluous in more than one side, since the instrument can be manipulated to give the desired proportional extension with the assistance of but a single index mark.

At that end of the sheet 1 which is not interspersed with the polygonal cut-outs, a protractor is formed consisting of the center 18 from which radiate lines forming an arcuate scale 19 for angular measurement. This scale is associated with cut out arcs 20 through which a pencil may be run for tracing arcs. The aggregate angle superscribed by these arcs is at least 180° and it is noted that the arc 20 is not continuous but has interrupted portions 21. In the embodiment of the invention as illustrated, the scale 19 is of appreciable width, in the form of an arcuate band, while the arcs 20 are discontinuous, part of them lying along the outer periphery of the scale band while the interrupted portions are bridged by arcs 20' lying along the inner edge of the scale band. In this manner bridges 22 of material connect the middle portion of the protractor with the body of the sheet or base plate which lies outside of the protractor, reinforcing and strengthening the base plate and preventing the protractor flexing inwardly or outwardly relative to the rest of the base plate as it would do if it were separated from the rest of the base plate by a continuous arc of 180°.

Furthermore, the inner arcs 20' overlap to some extent the outer arcs 21 so that certain angles which terminate near the ends of these arcs are superscribed by both arcs, making it possible to read the measure of the angles upon either arc, thus, as is stated in the objects of invention instilling into the mind of the user of the drawing instrument the truth that the length of the arc is of no moment in determining the measure of the angle, which may be measured by arcs on two different circles.

The side margins of the drawing instrument are provided with convenient linear scales 22 and 23, the former being a scale in inches while the latter is a scale of metric units. The lower half of the geometry drawing instrument is also provided in the side margins with a succession of holes 24 spaced apart, for convenience, the distance of the lines on ordinary fools-cap paper. The upper half of the sheet is provided with a similar succession of apertures 24' spaced apart the distance of the lines in a student's note book. Thus, the user of the instrument may, by virtue of these apertures make for himself a series of points determining the spacing of parallel lines which he may draw for himself upon a sheet of paper.

It is to be noted that the top and bottom margins of the sheet have a plurality of holes 25, 26 and 27 for determining points through which vertical lines may be drawn to define margins of various widths.

It is of course customary in the study of geometry to provide auxiliary lines when called for. This is conveniently done in the present device through the use of the serrations formed in one external edge of the instrument, in the present instance the top edge. There are two series of these serrations—a fine series, 28, and a coarse series, 29. After a polygon has been drawn the ruler is properly positioned for the drawing in of an auxiliary line and the pencil then rapidly passed across the points of the serrations making a dotted or sinuous auxiliary line, according to the rapidity with which the pencil is caused to traverse the serrations.

The series of deeper serrations is also useful in mechanical drawing, in drawing screw threads.

It is obvious that any one of the apertures formed in the sheet, or for that matter the vertices of any of the polygons may be used as centers for drawing, by rotating the drawing instrument while a pin is held in an appropriate center or vertex, a pencil being held in one of the rotating centers or vertices.

It is obvious that in the above description I have disclosed a form of invention in which not only is the minimum number of polygons essential to the study of geometry represented, but also, the various polygonal and arcuate shapes are so coordinated with other features of the instrument as to cause it to function in a manner radically different in many respects from its predecessors in the prior art. Therefore, without its being necessary to confine my invention to the specific details as shown except where so restricted by the implication of the appended claims, I desire to claim as my invention those coordinated features by which the novel functioning of my invention is produced.

I claim:

1. In an educational drawing instrument, a sheet of substantially rigid material provided with one or more polygonal cut-outs, at least one polygon having one side blank and provided on each other side with one or more marks dividing the marked sides into line segments in the same ratio for each such side.

2. In an educational drawing instrument, a sheet of substantially rigid material provided with one or more polygonal cut-outs, at least one polygon having one or more sides adjacent one angle blank and provided on each of one or more other sides with one or more marks dividing it into segments in the same ratio for each such side.

3. In an educational drawing instrument, a sheet of substantially rigid material provided with one or more polygonal cut-outs, at least one polygon being regular with one side provided with one or more marks dividing it into segments and the remaining sides blank.

4. In an educational drawing instrument, a sheet of substantially rigid material provided with one or more polygonal cut-outs, at least one polygon having at least two adjacent sides blanks and provided on each other side with one or more marks dividing the marked sides into line segments in the same ratio for each such side.

Signed by me at Baltimore, Maryland, this 10th day of August, 1929.

EDNA LEOLA DIXON.